United States Patent [19]

Nippert

[11] 3,918,625

[45] Nov. 11, 1975

[54] METHOD OF MAKING A DOUBLE EXTRUDED SEMICONDUCTOR JOINT

[75] Inventor: Russell A. Nippert, Delaware, Ohio

[73] Assignee: The Nippert Company, Delaware, Ohio

[22] Filed: Oct. 3, 1974

[21] Appl. No.: 511,939

[52] U.S. Cl. .................. 228/136; 29/509; 29/520; 174/52 S; 228/155; 357/81; 403/285; 29/581
[51] Int. Cl.² ......................................... B23K 31/02
[58] Field of Search .. 29/445, 470.5, 520 X, 509 X, 29/510, 590, 511, 581 X, 480 X, 591 X; 174/52 S; 403/285 X; 357/79, 81 X; 228/136, 155

[56] References Cited
UNITED STATES PATENTS

| 2,419,469 | 4/1947 | Spiro | 29/511 UX |
|---|---|---|---|
| 3,042,428 | 7/1962 | Gardiner | 29/445 UX |
| 3,182,117 | 5/1965 | Roovers | 174/52 S |
| 3,191,268 | 6/1965 | Matea | 29/511 X |
| 3,197,843 | 8/1965 | Nippert | 29/581 |
| 3,198,874 | 8/1965 | Dahl | 29/520 X |
| 3,199,000 | 8/1965 | Nippert | 357/81 |
| 3,348,297 | 10/1967 | Dijkmeijer | 29/581 X |
| 3,722,080 | 3/1973 | Sato | 29/581 |

Primary Examiner—Charlie T. Moon
Attorney, Agent, or Firm—Biebel, French & Bugg

[57] ABSTRACT

A heat sink mount for a pressurized semiconductor device is formed in two extrusion stages including a first bi-metal extrusion stage in which a steel ring brazed to the top of a copper billet is extruded together with the main body of copper to form a cup at the top of the main body defined by a depending collar integral with said ring and a mounting stem, a tube with a flared lower end is placed in the cup and a second extrusion is performed on the main body to cause flow of the collar material and to lock it into the flared end of the tube to form a tight joint.

4 Claims, 10 Drawing Figures

U.S. Patent  Nov. 11, 1975  3,918,625
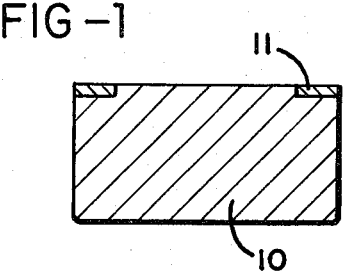
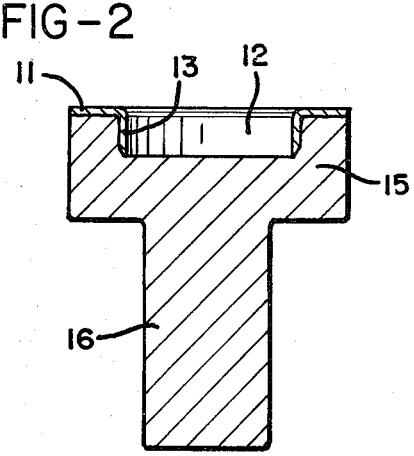
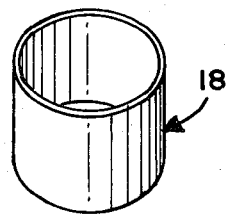
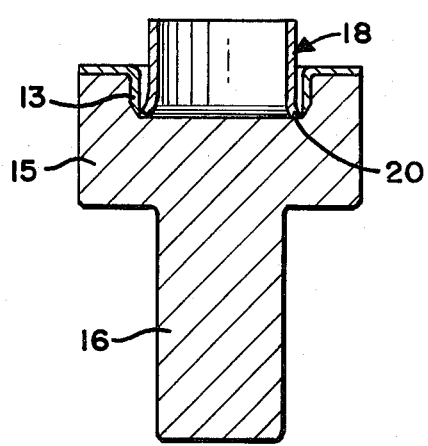
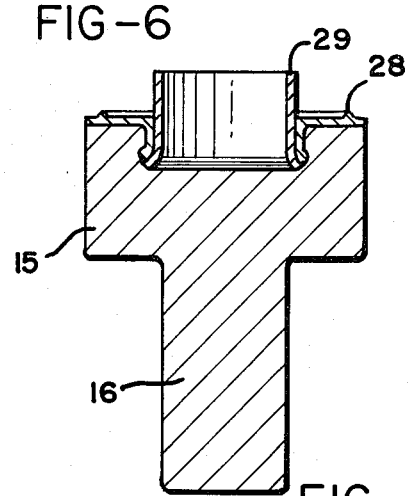
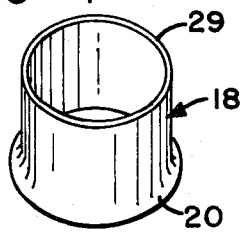
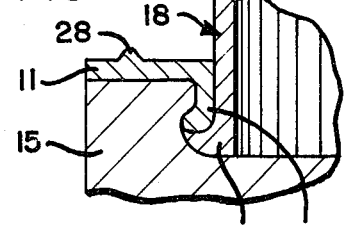
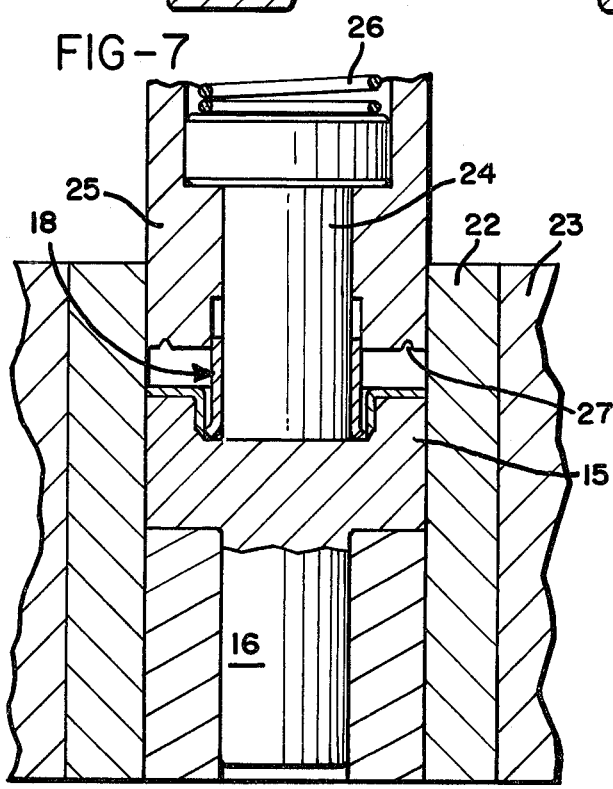
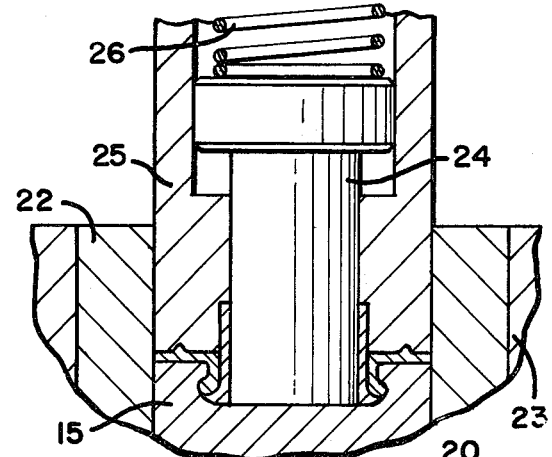
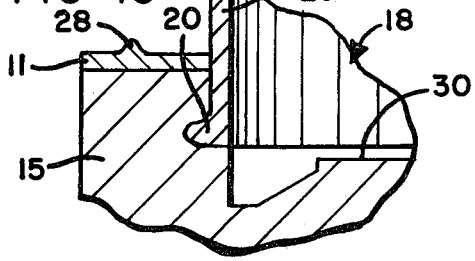

METHOD OF MAKING A DOUBLE EXTRUDED SEMICONDUCTOR JOINT

BACKGROUND OF THE INVENTION

Semiconductor mounts have been made by a process of extrusion as described in Nippert U.S. Pat. Nos. 3,199,000 and 3,197,843. Another system also used for large capacity semiconductors is a pressurized mount as shown in Seimens' U.S. Pat. No. 3,293,510 and Westinghouse Pat. Nos. 3,296,506 and 3,729,659. The brazing operation anneals and weakens the copper base which later, during mounting and thread torquing, results in internal distortion of the device mounting surfaces. Such distortion causes loss of thermal conductivity and corresponding reduced device performance. To prevent this, a heat treatable copper alloy is used which can be heat treated after brazing to regain the hardness loss. The most suitable material used is a copper alloy containing chromium and magnesium additives known as (Phelps-Dodge) PD-135. The material is expensive, not readily available, difficult to process, and has conductivity lower than Oxygen Free copper alloys. Other heat treatable copper alloys are unsatisfactory due mainly to low electrical conductivity. Further, the surface, under the head, available for thermal and electrical conductivity is limited to the diameter of the copper base.

SUMMARY OF THE INVENTION

In accordance with the present invention the mount is formed by cold-working a billet of a readily obtainable high conductivity oxygen-free copper alloy with a steel ring brazed to its upper surface and extruding to form a cup and a depending collar on the ring surrounding the cup. At the same time the extrusion forces copper from the main body into dies which give it the shape of a stem later to be provided with mounting threads. Thereafter a steel tube having a flared lower end is placed in the cup and the assembly subjected to a second extrusion around the cup to cause a flow of metal of the collar to thereby form-lock with the flared end of the tube. This forms a strong, stable, cold joint, and thus provides a highly satisfactory mount and one which can be produced economically and with little wastage. Further, the surface area available for thermal and electrical conductivity is greater than with previous methods.

REFERRING TO THE DRAWING

FIG. 1 shows the billet with the steel ring brazed to its upper surface;

FIG. 2 shows the result of the first extrusion operation;

FIG. 3 is a view of the steel tube;

FIG. 4 shows the lower end of the tube flared outwardly;

FIG. 5 shows the mount with the steel tube assembled therein;

FIG. 6 shows the assembly after the second extrusion;

FIG. 7 is a view showing the dies and the forming punch before the second extrusion takes place;

FIG. 8 shows the final stage of the second extrusion operation;

FIG. 9 is a view on a larger scale showing a detail of the metal formed lock between the collar of the ring and the flared end of the tube; and p FIG. 10 is a broken view showing a modified form of mount.

DESCRIPTION OF THE PREFERRED EMBODIMENT

Referring to FIG. 1 a billet 10 is shown of copper which is preferably an ordinary oxygen-free copper alloy, a suitable material being CDA 102. A ring 11 of mild steel is attached to the upper surface of the billet preferably by a silver brazing operation. This assembly is then put in an extrusion press which produces the shape shown in FIG. 2. This consists of a centrally located cup 12 in the top of the billet, the circumference of which is defined by a collar 13 resulting from the pressing operation and integral with ring 11. There is a main body portion 15 and a stem 16 extending from the body and adapted for later threading. This construction and method of formation are essentially those disclosed in Nippert U.S. Pat. Nos. 3,199,000 and 3,197,843.

Next a drawn tube 18 of mild steel is flared outwardly as shown at 20.

Next, the parts are assembled as shown in FIG. 5, the diameter of the flared portion 20 being approximately the same as the inner diameter of the collar 13 and having a close clearance fit therewith.

Referring now to FIG. 7, the assembly of FIG. 5 is placed in suitable dies 22, 23 and sizing pin 24 operating in a forming punch 25 is moved into the assembly such that the sizing pin 24 will be received through tube 18 to properly locate and center the assembly in the dies. Sizing pin 24 is spring-mounted as shown at 26 so that it merely maintains proper alignment without actually causing extrusion. When pressure is applied to the forming punch as is the case in FIG. 8 it will cause flow of the steel collar 13 against the flared end 20 of the tube and thereby form-locks these two elements together. Preferably the extrusion in this second stage is such as to cause a further downward flow of copper and thus lengthens the stem. It will also be noted that the lower face of punch 25 has a groove 27 to form a projection 28 on the ring 11 which is used when resistance welding the base to the cover of the semiconductor.

The invention thus provides a mount in the form of a heat sink for a semiconductor which is simple in construction, and reliable in operation so that when silicone discs are assembled thereto there is no damage from torque distortion during mounting of the finished semiconductor. The extrusion operations are carried out at room temperature and the copper becomes work-hardened by reason of such extrusion. Dimensional characteristics are constant and parallelism and flatness are improved since the parts are die-formed during the extrusion. The open end portion 29 of the tube is still ductile since it is not cold-worked during extrusion and thus the highly satisfactory for further staking operations.

FIG. 10 shows a modified construction of the mount in which the ring 11 is not extruded into the cup. That is, the copper forming the body 15 of the mount is extruded to lock form with the flared end 20 of tube 18, the construction and method of manufacture being the same in other respects. In some cases it is desirable to form a pedestal 30 in the bottom of the cup which is done by a machining operation. This form of mount is somewhat more economical because the dies do not need to draw the steel of ring 11 and hence are longer lived.

While the method and article herein described constitutes a preferred embodiment of the invention, it is to be understood that the invention is not limited to this precise method and article, and that changes may be made therein without departing from the scope of the invention.

What is claimed is:

1. The method of forming a mount for a pressurized semiconductor device comprising silver brazing a steel ring to the upper surface of a copper billet, extruding the billet to form a downwardly opening collar on the ring, an open cup in the main body of the mount and a lower stem forming a steel tube with a flared lower end, mounting the flared end of said tube in said cup, and extruding the main body of the mount to cause the metal to flow-lock the flared end of the tube forming a secure connection.

2. The method of forming a mount for a pressurized semiconductor device comprising silver brazing a steel ring to the upper surface of a copper billet, extruding the ring and the billet to form a downwardly opening collar on the ring, an open cup in the main body of the mount receiving said collar, and a lower stem on the billet, forming a steel tube with a flared lower end, mounting the flared end of said tube in said cup, and extruding the body of the mount to cause the metal of said collar to flow-lock the flared end of the tube forming a secure connection of high strength.

3. The method of claim 1 in which the copper is cold-formed and work-hardened.

4. The method of claim 1 in which the copper is high conductivity oxygen-free copper alloy.

* * * * *